United States Patent [19]

Jackowski et al.

[11] Patent Number: 5,418,909
[45] Date of Patent: May 23, 1995

[54] SYSTEM FOR CONTROLLING MULTIPLE PORT/MULTIPLE CHANNEL I/O CONFIGURATION ACCORDING TO COMMUNICATION REQUEST INITIATION STATUS

[75] Inventors: Stefan P. Jackowski; Ronald B. Jenkins, both of Endicott, N.Y.

[73] Assignee: International Business Machines Corporation, Armonk, N.Y.

[21] Appl. No.: 226,221

[22] Filed: Apr. 11, 1994

Related U.S. Application Data

[60] Continuation of Ser. No. 856,833, Mar. 23, 1992, abandoned, which is a continuation of Ser. No. 626,900, Dec. 13, 1990, abandoned, which is a continuation of Ser. No. 554,120, Jul. 18, 1990, abandoned, which is a division of Ser. No. 292,279, Dec. 30, 1988, abandoned.

[51] Int. Cl.⁶ .............................................. G06F 13/12
[52] U.S. Cl. .................................. 395/275; 364/238.3; 364/241.9; 364/DIG. 1
[58] Field of Search ................ 364/200, 900; 398/275; 395/275

[56] References Cited

U.S. PATENT DOCUMENTS

| | | | |
|---|---|---|---|
| 3,553,656 | 1/1971 | Bernhardt | 364/900 |
| 3,902,162 | 8/1975 | Parkinson et al. | 364/200 |
| 4,176,341 | 11/1979 | Miyazaki | 340/147 |
| 4,205,374 | 5/1980 | Bardsley, III et al. | 364/200 |
| 4,207,609 | 6/1980 | Luiz et al. | 364/200 |
| 4,275,095 | 3/1981 | Nadir | 364/200 |
| 4,314,335 | 2/1982 | Pezzi | 364/200 |
| 4,396,984 | 8/1983 | Videki, II | 364/200 |
| 4,400,771 | 8/1983 | Suzuki et al. | 364/200 |
| 4,437,157 | 3/1984 | Witalka et al. | 364/200 |
| 4,493,036 | 1/1985 | Boudreau et al. | 364/200 |
| 4,495,564 | 1/1985 | Draper et al. | 364/200 |
| 4,641,308 | 2/1987 | Sacarisen et al. | 364/200 |
| 4,649,475 | 3/1987 | Scheuneman | 364/200 |
| 4,688,221 | 8/1987 | Nakamura et al. | 371/13 |
| 4,697,232 | 9/1987 | Brunelle et al. | 364/200 |
| 4,716,523 | 12/1989 | Burrus, Jr. et al. | 364/200 |
| 4,730,864 | 12/1978 | Schlotterer | 364/200 |
| 4,766,534 | 8/1988 | DeBenedictis | 364/200 |
| 4,807,180 | 2/1989 | Takeuchi et al. | 364/900 |
| 4,814,980 | 3/1989 | Peterson et al. | 364/200 |
| 4,821,170 | 4/1989 | Bernick et al. | 364/200 |
| 4,821,177 | 4/1989 | Koegel et al. | 364/200 |
| 4,831,523 | 5/1989 | Lewis et al. | 364/200 |
| 4,858,108 | 8/1989 | Ogawa et al. | 364/200 |
| 4,868,742 | 9/1989 | Gant et al. | 364/200 |
| 4,922,410 | 5/1990 | Morikawa et al. | 364/200 |
| 5,025,370 | 6/1991 | Koegel et al. | 364/200 |

FOREIGN PATENT DOCUMENTS 7907467  3/1979  United Kingdom.

OTHER PUBLICATIONS

I.B.M. Technical Disclosure Bulletin, vol. 29, No. 9 dated Feb. 1987 (1 page).

*Primary Examiner*—Christopher B. Shin
*Attorney, Agent, or Firm*—Baker, Maxham, Jester & Meador

[57] ABSTRACT

The I/O configuration of a computer system includes two channels which are capable of being available on up to four interface ports, with the ports being incorporated within the channel in order to eliminate the need for an external switch. Control indicators are provided for monitoring the communications request initiation status of each channel and each port to achieve expeditious transfers through a selected port between the channel and peripheral devices. The I/O configuration is established responsive to the communications request initiation status that indicates one of several states depending on which side initiates a request and whether the connection has been made.

11 Claims, 11 Drawing Sheets

CHANNEL/PORT CONFIGURATIONS

PORT CONNECTION ROUTINE PG. 1 OF 2

FORMAT OF TRANSMISSION FRAMES

TYPES OF CHANNEL CONNECTIONS

FIG. 7A

| EVENTS | INACT | CHANNEL CONNECTION | | | | ERROR RECOVERY | | |
|---|---|---|---|---|---|---|---|---|
| | | SMPLX T (ST) | SMPLX R (SR) | DUPLX 1 (D1) | DUPLX 2 (D2) | PD XMIT (ER1) | PD REC (ER2) | PDR REC (ER3) |
| REC CS-PE (1) | SR | D2 | DN | DN | DN | /// | /// | /// |
| NO CHNL CONN NOTE1 NOTE2 | SR NOTE2 | /// | ER1 NOTE3 | /// | /// | DN | DN | DN |
| REC CS-DE (2) | DN | IN | IN | IN | DN | /// | /// | /// |
| NO CHNL CONN | ER1 | /// | ER1 | /// | /// | DN | DN | DN |
| REC CS-CS,CS PS CS-AE (3) | SR | D2 | DN | DN | DN | /// | /// | /// |
| NO CHNL CONN | ER1 | /// | ER1 | /// | /// | DN | DN | DN |
| REC CS-ERROR (4) | SR | D2 | DN | DN | DN | /// | /// | /// |
| NO CHNL CONN | ER1 | /// | ER1 | /// | /// | DN | DN | DN |
| REC PS-PE (5) CHNL CONNECT NOTE4 | ER1 | D1 | ER1 | DN | DN | /// | /// | /// |
| NO CHNL CONN | ER1 | /// | ER1 | /// | /// | DN | DN | DN |

| | | | | | | | | |
|---|---|---|---|---|---|---|---|---|
| REC PS-DE (6) CHNL CONNECT NO CHNL CONN | ER1 ER1 | IN /// | IN ER1 | IN /// | D1 /// | /// DN | /// DN | /// DN |
| REC PS-AE (7) CHNL CONNECT NO CHNL CONN | ER1 ER1 | D1 /// | DN ER1 | DN /// | DN /// | /// DN | /// DN | /// DN |
| REC PS-ERROR (8) CHNL CONNECT NO CHNL CONN | ER1 SR | D1 /// | DN ER1 | DN /// | DN /// | /// DN | /// DN | /// DN |
| XMT CS-PE (9) | ST | DN | D2 | DN | DN | DN | DN | DN |
| XMT PS-PE (10) | /// | DN | D1 | DN | D1 | DN | DN | DN |
| XMT PS-DE (11) REC DE | /// | IN | IN | IN | D1 | /// | /// | /// |
| CHNL CONNECT NO CHNL CONN | ER1 ER1 | IN /// | IN ER1 | IN /// | D1 /// | /// DN | /// DN | /// DN |

INTERNAL CHANNEL SWITCH STATES
FIG.7B

| EVENTS | INACT (IN) | CHANNEL CONNECTION | | | | ERROR RECOVERY | | |
|---|---|---|---|---|---|---|---|---|
| | | SMPLX T (ST) | SMPLX R (SR) | DUPLX 1 (D1) | DUPLX 2 (D2) | PD XMIT (ER1) | PD REC (ER2) | PDR REC (ER3) |
| REC PD (13) | ER2 | ER2 | ER2 | ER2 | ER2 | ER2 | DN | ER2 |
| REC PDR (14) | ER3 | ER3 | ER3 | ER3 | ER3 | ER3 | ER3 | DN |
| XMIT PD (15) | ER1 | ER1 | ER1 | ER1 | ER1 | DN | ER1 | ER1 |
| REC IDLES (16) | DN | DN | DN | DN | DN | DN | IN | IN |

DN - DO NOTHING.
CS - CONNECT START
    (A FRAME WHICH INITIATES A CONNECTION).
PS - PASSIVE START
    (A FRAME WHICH LEAVES THE CONNECTION AS IS).
PE - PASSIVE END
    (A FRAME WHICH LEAVES THE CONNECTION AS IS).
DE - DISCONNECT END
    (A FRAME WHICH REMOVES A CONNECTION).
AE - ABORT END (A FRAME WHICH IS ABORTED).
///- THE COMBINATION OF THIS EVENT AND THIS STATE
    IS IMPOSSIBLE.
IDLES - CHARACTERS INDICATING THE INTERFACE IS INACTIVE.

PD XMIT(ER1)  -PORT DISCONNECT TRANSMIT STATE.

PD REC(ER2)  -PORT DISCONNCECT RECEIVE STATE.

PDR REC(ER3)  -PORT DISCONNECT RESPONSE RECEIVE STATE.
INACT(IN)    -INACTIVE STATE

RE OR REC    - RECEIVE.
XM,XMT OR XMIT  - TRANSMIT
CHNL CONNECT  - THE CHANNEL IS ALREADY CONNECTED TO THE PORT.
NO CHNL CONNECT - THE PORT HARDWARE WILL RESPOND TO THE EVENT BECAUSE NO CONNECTION HAS BEEN MADE TO THE CHANNEL.

INTERNAL CHANNEL SWITCH STATES
FIG.8

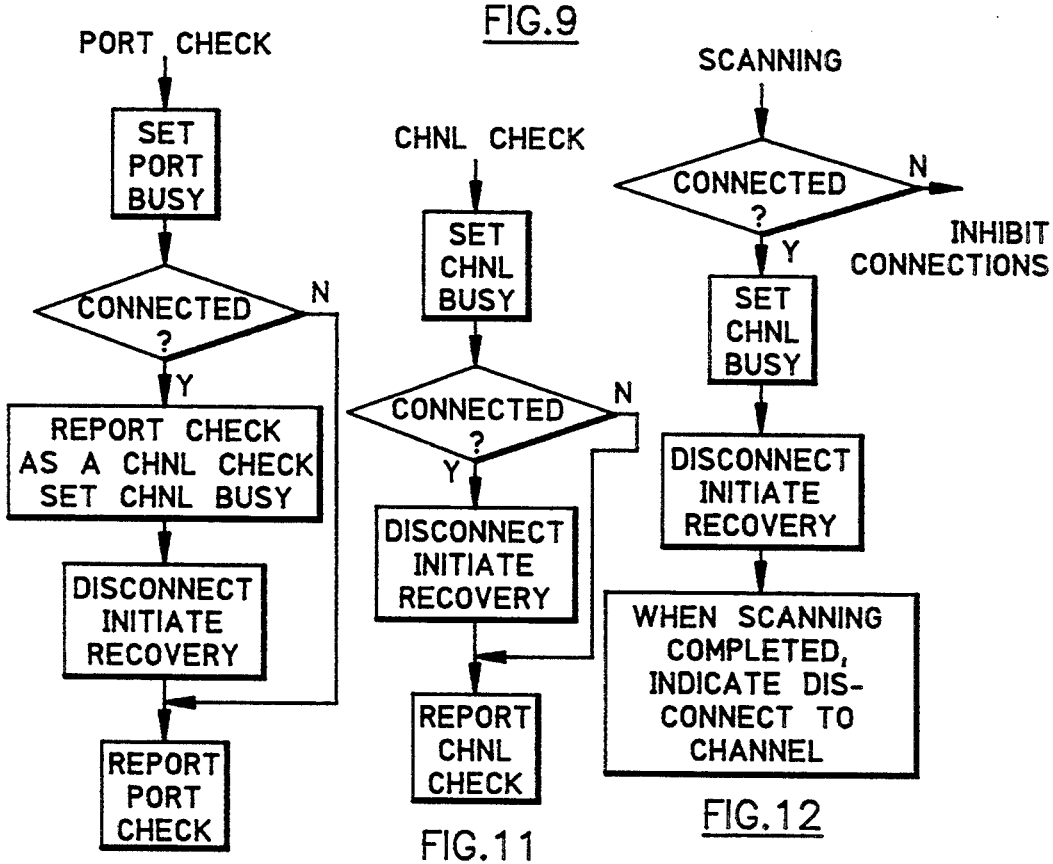

SYSTEM FOR CONTROLLING MULTIPLE PORT/MULTIPLE CHANNEL I/O CONFIGURATION ACCORDING TO COMMUNICATION REQUEST INITIATION STATUS

This is a continuation of application Ser. No. 07/856,833 filed, Mar. 23, 1992, abandoned, which is a continuation of application Ser. No. 07/626,900, filed Dec. 13, 1990, abandoned, which is a continuation of application of Ser. No. 07/554,120, filed Jul. 18, 1990, abandoned, which is a division of application Ser. No. 07/292,279, filed Dec. 30, 1988, abandoned.

This invention relates generally to I/O channels in a computer system, and more particularly to a multiple channel configuration capable of switching its availability for connection with a multiple number of interface ports.

BACKGROUND OF THE INVENTION

It is common practice in a computer system to have a number of I/O peripheral devices connected through one or more channels to computer systems. This is true with respect to main frame, mid-size and micro-computers. Typically, there are more I/O devices used with a computer than channel interfaces, so in the past it has been necessary to provide an external switch to selectively connect individual I/O devices to a channel as the need arises, or a "daisy chain" of the devices. Also, there was a trend toward having multiple channels to facilitate the various transfers of data back and forth between the computer system and the I/O devices such as printers, terminals, external storage, and the like. Of course, adding additional channels and/or providing an external switch can be expensive. Moreover, when an error occurred anywhere in the system, it was reported as immediate and damaging without regard to where the error had arisen. As a result, overall machine availability was adversely affected even though the area where the error arose was not in use at the time. Thus there is a need to accommodate a growing number of I/O devices without increasing the manufacturing and maintenance expenses of the system, and without proliferating the number of channels required. And when an error occurs, it would be desirable to isolate the error immediately and report it to the rest of the system only to the extent the rest of the system is affected.

OBJECTS AND SUMMARY OF THE INVENTION

It is a primary object of the invention to provide maximum flexibility in the attachment of multiple interfaces to a multiple number of channels through a number of interface ports which are connected to the I/O peripheral devices. A related object is to provide a connection scheme which does not allow simultaneous usage of a channel by more than one interface port, but which allows all of the channels to have the capability of talking to any of the existing ports.

Another object in order to achieve flexibility is to allow connections and disconnections to be made from either the interface or from the channel.

A further object in order to increase the efficiency of the internal operation of the computer system is to have channel-initiated requests for connection be given priority over device-initiated requests for connection.

Still another object of the invention is to provide a priority scheme to prevent a single interface from excluding other interfaces from gaining access to the channel.

Yet another object is to eliminate the need for an external switch by providing a plurality of ports which are internal to the channel and are actually part of the channel.

Another important object is to have each port isolated from each other so that errors are reported only to the areas affected by the errors. A related object is to provide immediate disconnection between a port and a channel upon detection of an error so that the error can be isolated.

Another object is to isolate the ports, and thus any device, from maintenance or diagnostic functions (e.g., scanning the logic), which require machine clocks to be stopped in the channel subsystem, and to allow for a smooth recovery from this condition once clocks are started again.

An additional object is to report port checks independently of channel checks in order to free the channel from taking the time to recover from errors on ports which are not conversing with the channel.

Accordingly, the invention provides two channels which are capable of being available on up to four interface ports, with the ports being incorporated within the channel in order to eliminate the need for an external switch. Error reporting is limited to the area directly affected by the error, and immediate disconnection helps to isolate the error and allow time for error recovery before the particular channel or port again becomes available.

Although specific objects and summaries of the important features of this invention have been set forth above, it is understood that the scope of the invention will become apparent from the description given hereinafter and from the accompanying drawings. However, it should be understood that the details in this invention specification are given by way of example and illustration only, and various changes and modifications will become apparent to those skilled in the art, all within the spirit of the invention.

BRIEF DESCRIPTION OF DRAWINGS

FIGS. 7A, 7B, and 8 together form a table showing various internal channel switch states that occur in a presently preferred embodiment of the invention;

FIG. 9 is a table showing the internal channel switch states which occur in the event of a port check, or a channel check, or scanning;

FIG. 10 is a flow chart for a port check;

FIG. 11 is a flow chart for a channel check; and

FIG. 12 is a flow chart for scanning.

DETAILED DESCRIPTION OF PREFERRED EMBODIMENT

Figure 1A:
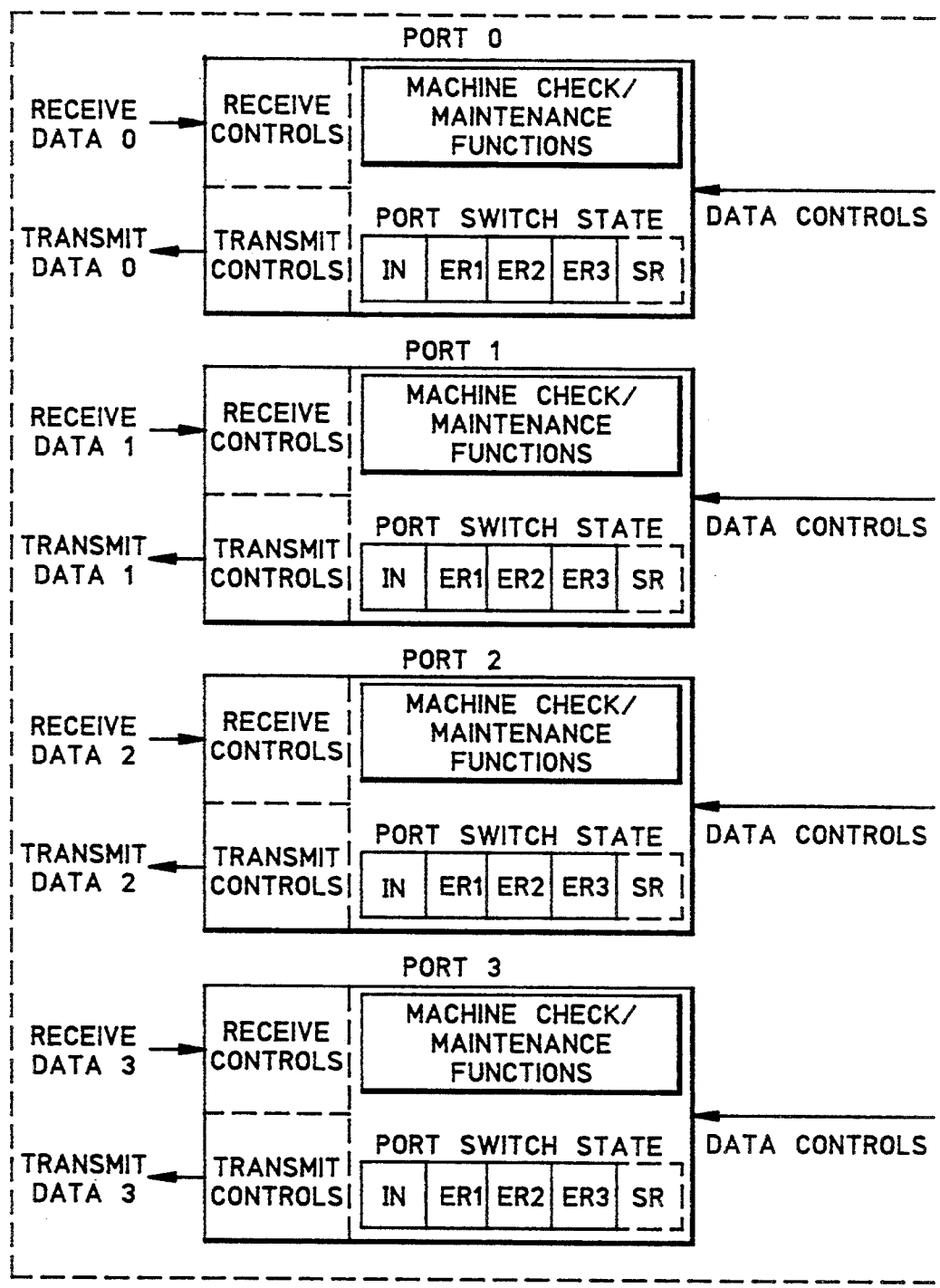
FIGS. 1A and 1B are a high level diagram showing the interconnection between multiple channels and multiple ports in a presently preferred embodiment of the invention.
Figures 1, 1B:
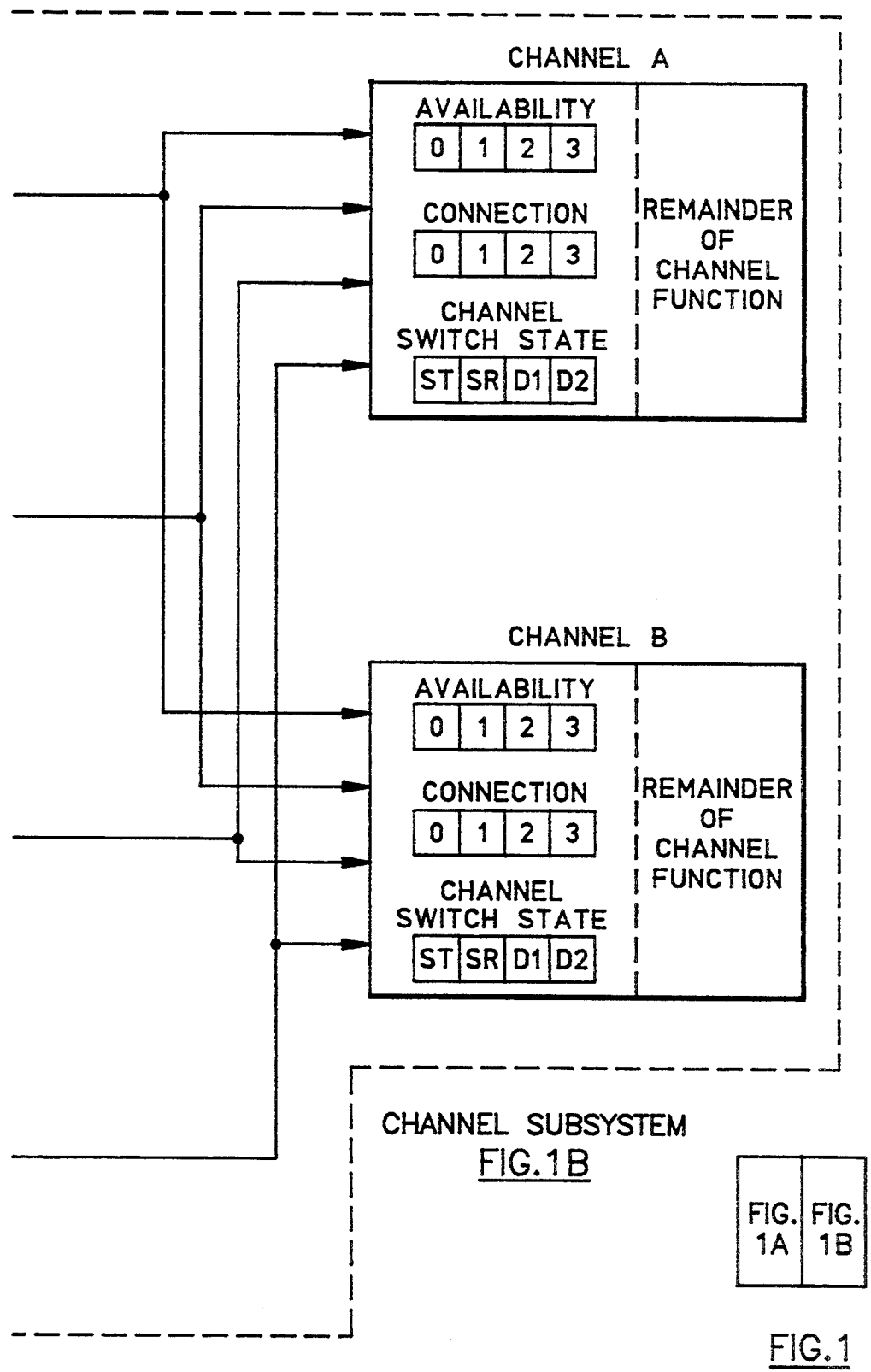
Figure 2:
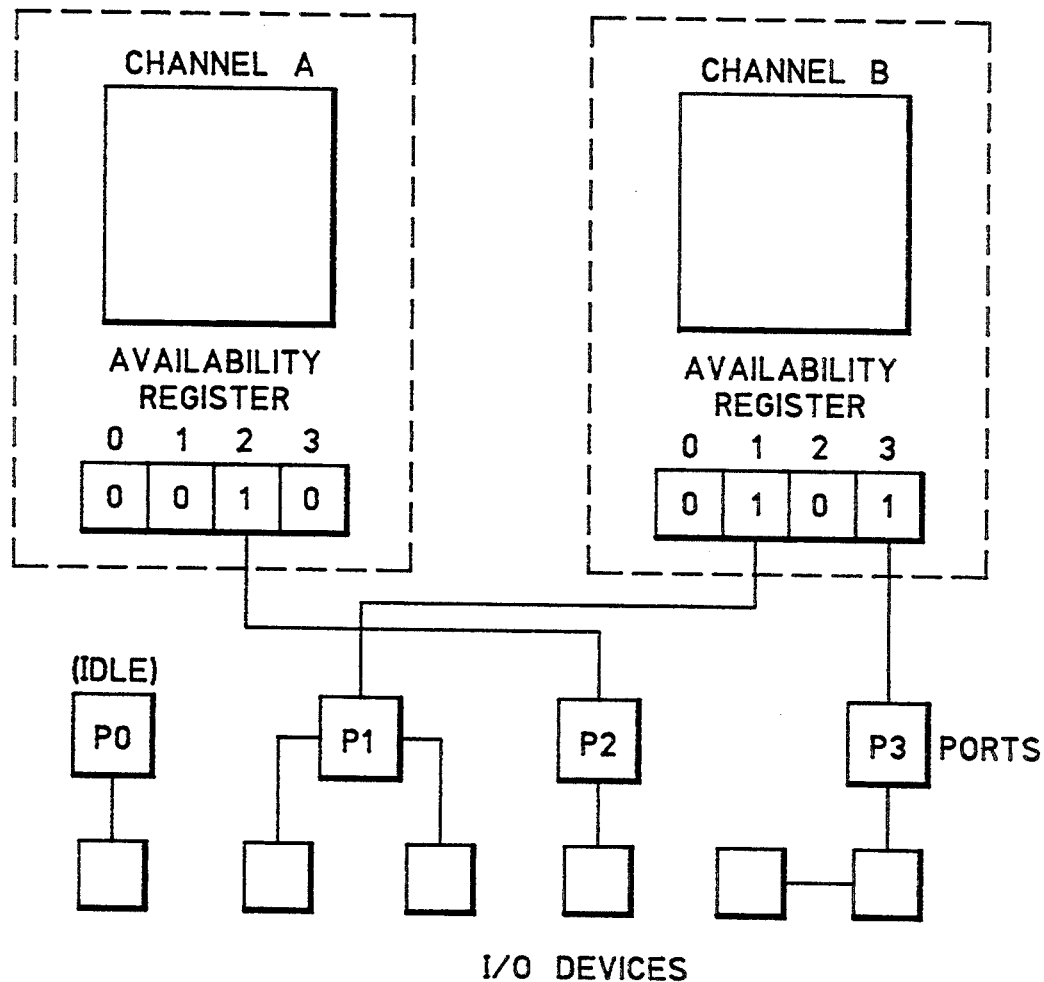
FIG. 2 is a schematic diagram and table showing two channels capable of being available on up to four interface ports.

Generally speaking, the illustrated form of the invention is in the form of a star configuration consisting of two channels capable of being available on up to four interface ports (see FIGS. 1 and 2). The division of ports between the two channels in a maximum configuration (i.e., all ports used by the two channels) can be in the following combinations: zero-four, one-three, two-two, three-one, or four-zero. Although the cases of zero-four and four-zero result in the waste of an entire channel, it is allowed due to the flexibility in the design. In the preferred embodiment, an availability scheme for allocating certain ones of the ports to only one channel is determined at initial machine load (IML) and provides for one of the ports to be constantly connected to the same channel. However, the allocation could be done dynamically if so desired.

The rule of thumb followed is that channels may have more than one interface port available for connection, but only one connection to an interface port may exist at a time for a given channel. Simply put, a channel will only be conversing on one interface at a time.

The machine check reporting process for the interface ports available on a given channel are capable of being independent from the machine check reporting process for the channel itself. When a check occurs on a port which is unconnected, the check can be logged but need not be treated as a check which would halt any channel operations. When the check occurs on a connected port, however, the check should be logged the same way as a channel check in that it actually does affect channel operations at that point in time.

Within the port, if a port check occurs, the port should take actions necessary to fence off the interfaces from any errors. For example, if a frame is being transmitted at the time of the check, it should be aborted so as to not send improper data across any interface. It should also be noted that if a port is connected to a channel, any checks occurring at the channel level should cause the port to respond as though a port check has occurred.

Reporting port checks independently of channel checks frees the channel from taking the time to recover from errors on ports which are not conversing with the channel. However, it should also be realized that if a check is occurring on a port which is unconnected, the channel implementation should call for the recovery from that check before allowing the channel to connect to that port if requested to.

The connection scheme allows a channel request for connection to a specific port to have priority over any port request for connection. For simultaneous requests for connection from multiple ports, a "least recently used" priority scheme is employed. Connection requests are honored only if no other ports are presently connected and if no activity is occurring on the specific port for which the connection is requested. Similarly, disconnection from a port may only occur when no activity is occurring on the port which is connected.

Figure 5:
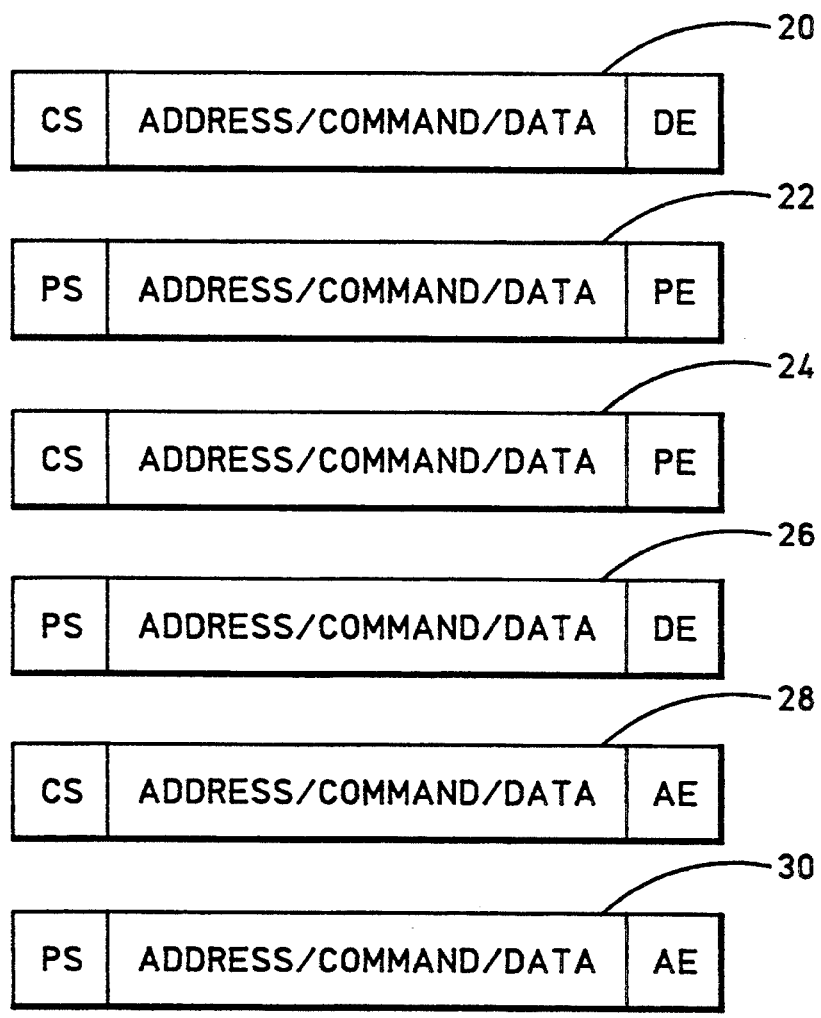
FIG. 5 shows the type of transmission frames being sent from I/O devices and/or from a channel.
Figure 6:
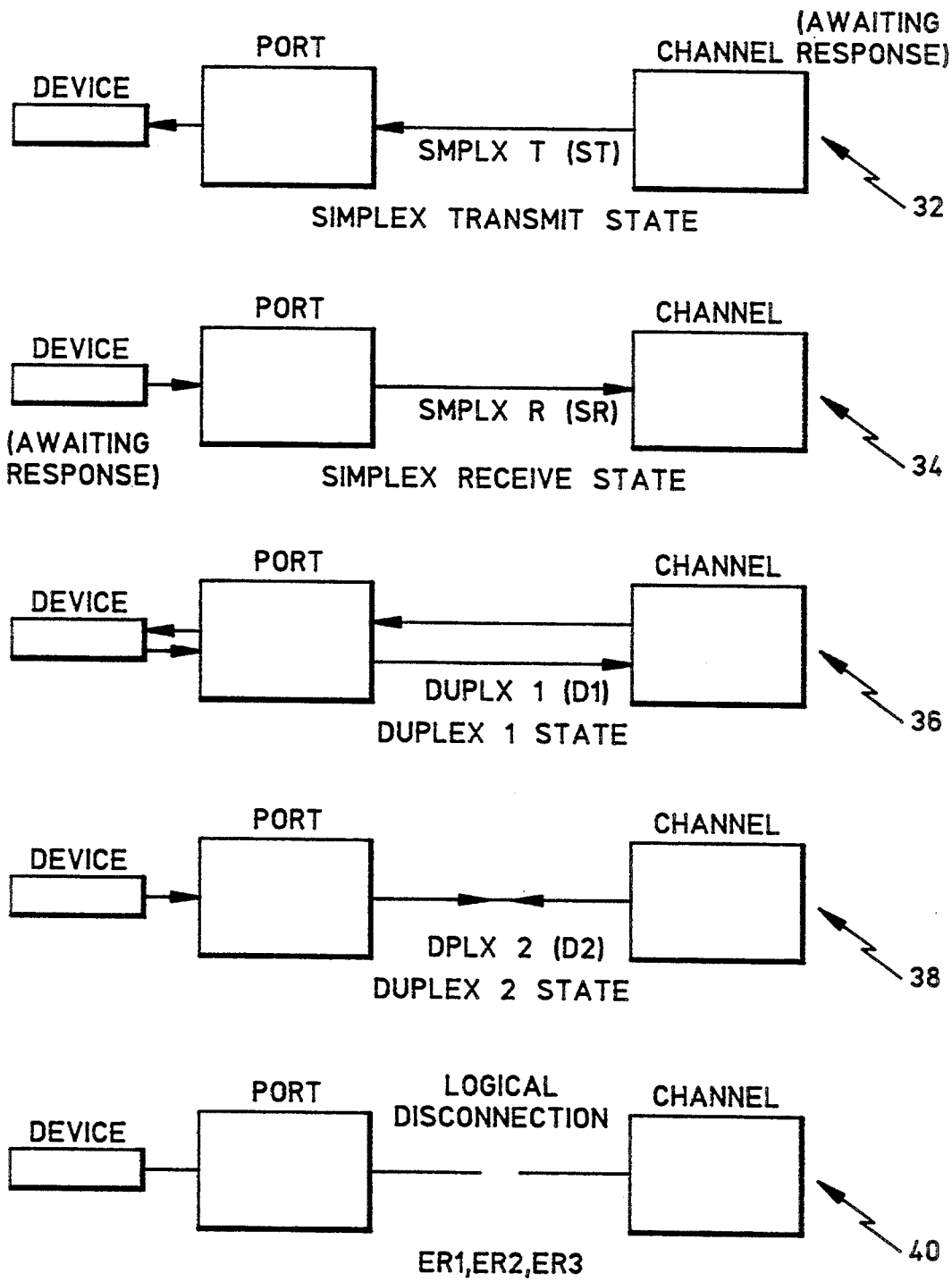
FIG. 6 illustrates some of the link levels that occur during channel/port interconnections.

Referring more specifically to the details of the preferred embodiment, some of the various terms and/or abbreviations used in the tables of FIGS. 7, 8 and 9 are illustrated in FIGS. 5 and 6. For example, the various combinations of start/end frame delimiters 20, 22, 24, 26, 28, and 30 will result in various responses from a port or channel receiving them, all depending on the switch state of the port or channel at the time the frame is received. Some of the typical types of channel/port interconnections 32, 34, 36, 38 and 40 all have direct effect on the response made in the event of a new request or the occurrence of an error.

The simplex transmit state (ST) indicates a connection was initiated by the channel but the channel has not yet received a response from the device. The simplex receive state (SR) indicates a connection was initiated by the device but the channel has not yet responded to it. The duplex 1 state (D1) indicates that a connection was made and a response given. The duplex 2 state (D2) indicates that a connection was initiated simultaneously by the device and by the channel.

In the three error conditions ER1, ER2 and ER3, the connection between the port and the channel is removed. ER1 is identified as a port disconnect transmit state (PD XMIT), and is entered if the channel must initiate error recovery. In the present embodiment, this is accomplished by transmitting a special sequence of characters to the device. ER2 is identified as a port disconnect receive state (PD REC), and is entered if the device has initiated error recovery. In the present embodiment, this is indicated by the reception of a special sequence of characters from the device. These characters are the same as those the channel transmits while in ER2. If in this state, the channel transmits a different sequence of special characters to indicate our reception of the error recovery sequence initiated by the device. ER3 is identified as a port disconnect response receive state (PDR REC), and is entered if the device is responding to the error recovery sequence initiated in the PD XMIT state. In the present embodiment, this is indicated by the reception of a special sequence of characters from the device. These characters are identical to those transmitted by the channel while in ER2. If in this state, the channel transmits idling characters which will enable the device to return to its INACTIVE state.

In the tables of internal channel switch states (FIGS. 7, 8 and 9), the EVENTS in the leftmost column are things which can occur on the interface to the device which potentially cause a change in the state. In the uppermost column headings, starting with INACT are the states. The columns labeled SMPLX T(ST) . . . PDR REC(ER3) could be considered as substates of the link-level states shown above the groups of columns. As indicated in the table, INACT(IN) has no substates associated with it. The entries in the table all indicate the next state or substate that will be entered while in the above substate if the event at the left occurs. For example, if while in the INACT(IN) state, an REC CS-PE event (event #1) occurs, the next state entered will be the SMPLX R(SR) substate of the CHANNEL CONNECTION state.

With respect to Note 1 in the table, NO CHNL CONN indicates that the occurrence of this event did not result in the connection of the channel. For this case, the port hardware must respond to the event. With respect to Note 2, the SR state entered in events 1 and 4 if NO CHNL CONN occurs while INACTIVE does not actually imply a channel connection. It could be viewed to be the virtual state of the port until the port completes its response to the device. In event 1, the port responds to the device with a BUSY frame having a PS-DE, and then returns to the INACTIVE state. In event 4, the ERROR that ends the event is not a machine check; it is an error that occurred on the interface to the device, unrelated to the port hardware or the channel hardware. The port responds to the device with a REJECT frame, also having a PS-DE, and then returns to the INACTIVE state.

With respect to Note 3 in the table, in all events where there is an entry for the SR state when there is NO CHNL CONN, the SR state is the virtual state of the port during that event. With respect to Note 4, the logic can be in the INACTIVE state and simultaneously be connected because the connect bits associated with a port do not indicate the channel has actually transmitted anything yet. When the channel requests the connection and the port becomes connected, a CHANNEL CONNECTION state will not actually be entered until a REC CS or XMT CS actually occurs.

Although it is believed that the Internal Channel Switch States table is self-explanatory when considered in conjunction with the various flow charts, some examples for making a connection will now be described. If a connection is initiated by the device, event 1 would be the first event to occur. This would take us from the INACTIVE state to the SIMPLEX R state. A normal response by the channel would be a frame having a passive start and passive end (event 10). We would enter the DUPLEX 1 state. When the I/O operation is completed, the port will be disconnected by either the transmission or reception of a disconnect end. Event 6 or 11 would accomplish this.

If the connection is initiated by the channel, the channel initially sets channel busy to prevent other ports from making a connection (see the connection routine) and then requests connection to the channel. In our embodiment channel busy is simply a latch which will prevent any device initiated connection if no connection presently exists. If the connection is granted, the state will remain INACTIVE until an actual XMT CS is sent. However, the connection bit will be on. Event 9 should occur next and change the state to SIMPLEX T. Event 5 would take us into the DUPLEX 1 state. And as before, Event 6 or 11 would disconnect us.

Some more unusual scenarios will now be described. All events which cause ER1 to be entered are conditions which call for error recovery. When ER1 is entered, the port transmits a sequence called the port disconnect special sequence (PD). A handshaking process now occurs. The port expects to receive a port disconnect response (PDR) sequence in response to the PD sequence (ER3)(event 14). The channel will transmit idle characters while in ER3 and expects to receive idle characters then as the device response. Thus, while in ER3, reception of idle characters takes us to INACTIVE (event 16). If the device transmits a PD sequence (ER2)(event 13), the response will be the PDR sequence. When idle characters are received (event 16), the INACTIVE state occurs.

Another rather special sequence of events would occur if event 1 were followed by event 9. This would occur if the channel was preparing to initiate a connection and did not see that the deviced initiated the connection first. This would result in the DUPLEX 2 state. It cam be seen that in this state it would take two disconnect ends (DE) before the INACTIVE state would be entered again. The same thing would happen if event 9 occurred prior to event 1. If they occurred simultaneously, we would never go into either simplex state, but would change immediately from INACTIVE to DUPLEX 2.

For event 3, a CS-CS or CS-PS simply implies that the end-of-frame delimiter may have been lost during transmission, and the present frame was ended by receiving another start-of-frame delimiter.

Whenever the SR state is entered virtually (event 1 or 4, if NO CHNL CONN), the port will be sending either a busy or a reject frame independent of the channel's knowledge. This will cause the device to disconnect because these frames have a PS-DE. If any other event occurs before the DE is sent, the port will do error recovery.

Figure 3:
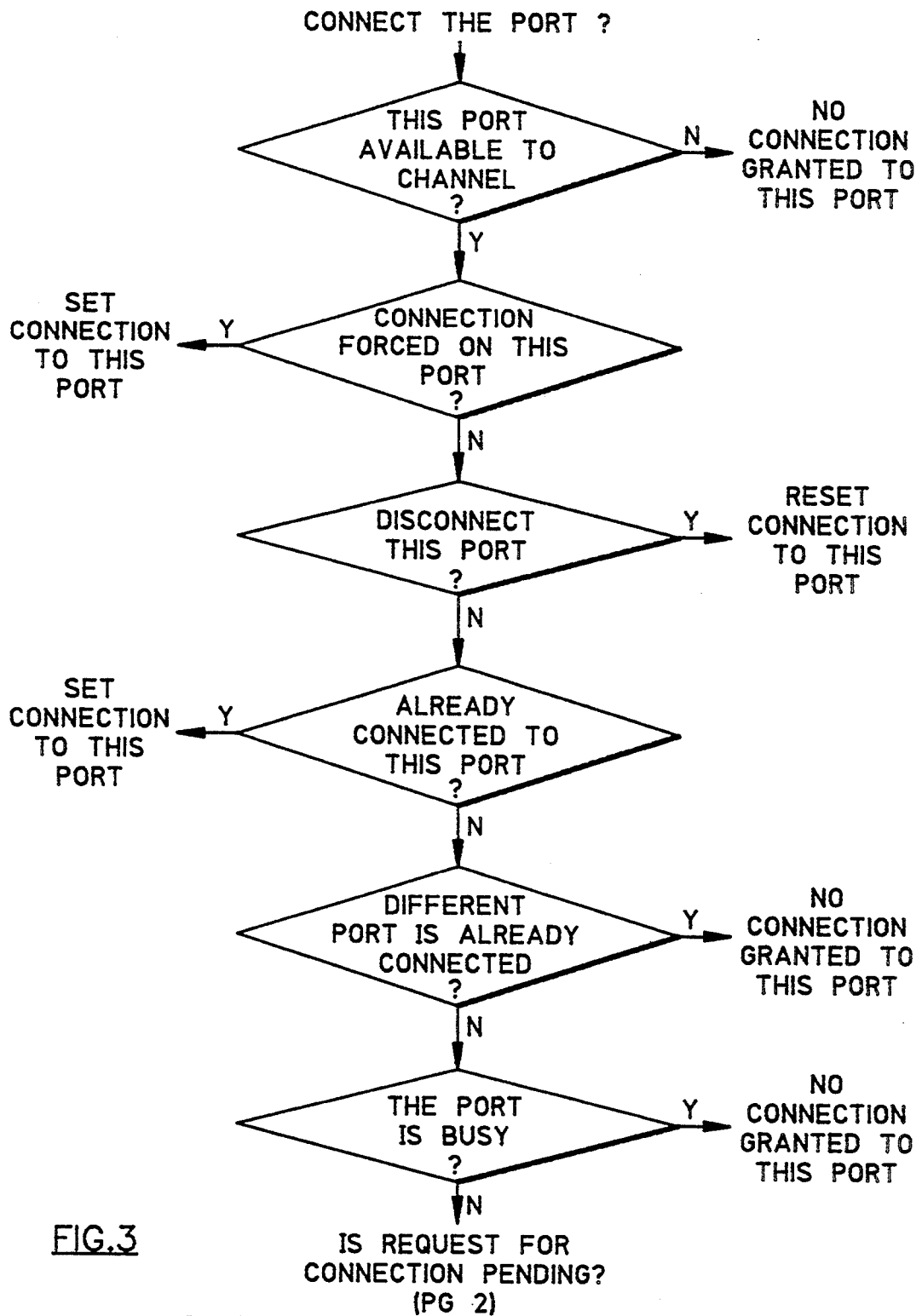
FIGS. 3 and 4 are a flow chart showing a typical port connection routine.
Figure 4:
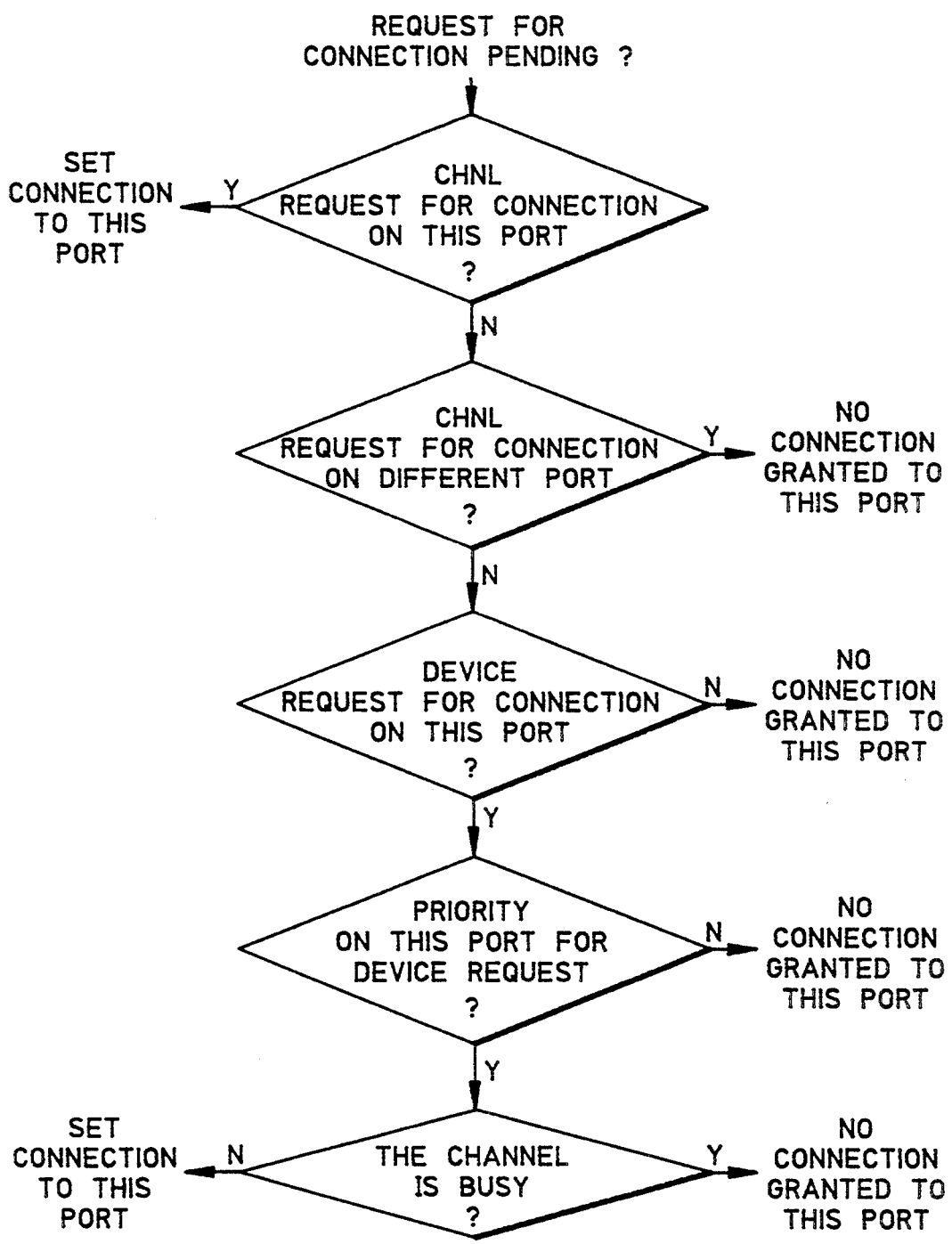

Referring now to FIGS. 3 and 4, the port connect routine occurs on every clock cycle of the channel and occurs independently on each port. The decisions shown on FIG. 3 are done before checking to see if a request for connection is occurring from the channel or the port—these are taken care of as shown in FIG. 4. Referring to FIG. 4, it is clear that the channel has the highest priority when granting connections. Also, priority for simultaneous device requests is determined on a "least recently used" basis.

It is to be noted that a port might be busy for a couple of reasons. The most likely would be that it is transmitting a busy or reject frame or it might be doing error recovery with the device. Regardless, it is impossible to make a connection then. With respect to a channel being busy, a channel busy is a signal set by the channel to prevent ports from gaining access via a connection. This allows the channel to control the setting of the connection bits on the ports which are available to it. If a connection already exists, (i.e., the port was granted a connection before the channel busy was set), the connection will remain until properly removed.

As best shown in FIGS. 9–12, the invention contemplates disconnects of the port from the channel when either a channel check occurs or a port check or scanning occurs. In this regard, the scanning which is done in the central computer system and related channel subsystems for purposes of maintenance and diagnostics does not affect various functions performed in the ports.

In view of all the foregoing, it will be apparent to those skilled in the art that various changes and modifications are possible in order to implement the features of the invention. Such variations are not to be regarded as a departure from the spirit and scope of the invention, and all such modifications as would be obvious to one skilled in the art are intended to be included within the scope of the following claims.

We claim as our invention:

1. A computer system in which each of a plurality of requests for a communications connection between at least one of a plurality of selectable peripheral devices and a computer causes said at least one of said plurality of selectable peripheral devices to be selected for connection and connected through an I/O interface to one of a predetermined number of channel members connected to said computer, said channel members being for receiving and transmitting communications, said communications including data organized in control and data frames, said communications connection having a communications initiation status representing at least one of a plurality of available states of said communications across said communications connection said computer system comprising:

a channel subsystem having said predetermined number of channel members therein, each said channel member in said channel subsystem including transfer means for transmitting said control and data frames to said at least one selected peripheral device and for receiving said control and data frames from said at least one selected peripheral device;

a port subsystem forming part of said channel subsystem and having a given number of individual independent ports connected with said plurality of selectable peripheral devices, each said port in said port subsystem being for carrying said communications between said plurality of selectable peripheral devices and any one of said channel members in said channel subsystem, with said given number of ports being greater than said predetermined number of channel members;

connection status means connected to each of said channel members in said channel subsystem for indicating which of said ports in said port subsystem is connected to said each channel member;

access means connected to said connection means for allowing no more than one of said ports in said port subsystem to be connected to any said channel member in said channel subsystem at any time; and switch state means connected to each of said channel members in said channel subsystem for indicating at least one of said available states of said initiation status of said requested communications connection and for controlling said communications connection between said each channel member in said channel subsystem and said at least one selected peripheral device, said available states including a first simplex state wherein said communications connection is requested by one of said channel members but not yet made and a second simplex state wherein said communications connection is requested by one of said selectable peripheral devices but not yet made and a first duplex state wherein said requested communications connection is made and a second duplex state wherein said communications connection is simultaneously requested by said one channel member and said one selectable peripheral device.

2. The system of claim 1 further comprising:

control means connected with said channel subsystem and said port subsystem for establishing a priority of said request for said communications connection so that one said request from a first said channel member in said channel subsystem for said communications connection having said first simplex state with a first said port in said port subsystem takes precedence over another said request from a second said port in said port subsystem for a second said communication connection having said first simplex state with said first channel member in said channel subsystem.

3. The system of claim 2 wherein:

said control means is for establishing the priority of said request for said communications connection so that two or more simultaneous said requests for said communications connection from a second plurality of said ports in said port subsystem to one said channel member in said channel subsystem are reordered to give priority to said request from said port in said port subsystem that was least previously used among said second plurality of said ports in said port subsystem.

4. The system of claim 1 wherein:

each said channel member in said channel subsystem is connected to its own said connection status means and to its own said switch state means, sharing neither said connection status means nor said switch state means with any other said channel member in said channel subsystem.

5. The system of claim 1 wherein said switch state means comprises:

a first identifier means for indicating said first simplex state when said request for said communications connection with said at least one of said plurality of selectable peripheral devices was initiated by a particular said channel member in said channel subsystem and that said particular channel member in said channel subsystem has not yet received a response to said request.

6. The system of claim 1 wherein said switch state means comprises:

a second identifier means for indicating said second simplex state when said request for said communications connection to said one of a predetermined number of channel members in said channel subsystem was initiated by a one of said plurality of selectable peripheral devices through an associated said port in said port subsystem and that said one of a predetermined number of channel members in said channel subsystem has not yet responded to said request.

7. The system of claim 1 wherein said switch state means comprises:

a third identifier means for indicating said first duplex state when said request for said communications connection between said one of a predetermined number of channel members in said channel subsystem and said at least one of said plurality of selectable peripheral devices through an associated said port in said port subsystem was made and a response to said request was given.

8. The system of claim 1 wherein said switch state means comprises:

a fourth identifier means for indicating said second duplex state when said request for said communications connection between said one of a predetermined number of channel members in said channel subsystem and said at least one of said plurality of selectable peripheral devices through an associated said port in said port subsystem was initiated simultaneously by said at least one of said plurality of selected peripheral devices and said one of a predetermined number of channel members in said channel subsystem.

9. The system of claim 1 further comprising:

availability means connected to said channel subsystem for indicating that certain of said ports in said port subsystem are available for connection with each said channel member in said channel subsystem.

10. The system of claim 9 wherein:

said availability means is for indicating that certain of said individual ports in said port subsystem are available for connection to a single no more than one of said channel members in said channel subsystem.

11. The system of claim 9 wherein:

said availability means is for indicating said port and channel member allocations as determined either at initial start-up of said computer system or dynamically during operation of said computer system.

* * * * *